Feb. 19, 1952    J. J. SANDERS    2,585,966
CHIP BREAKER RELIEF GRINDING FIXTURE
Filed May 4, 1950                          2 SHEETS—SHEET 1
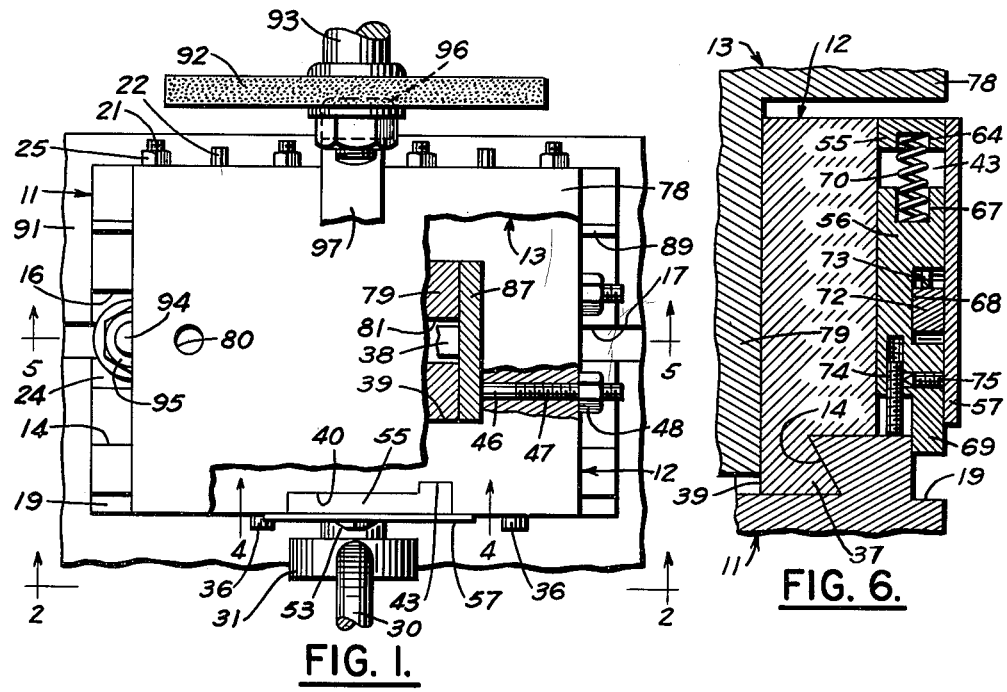
FIG. 1.
FIG. 6.
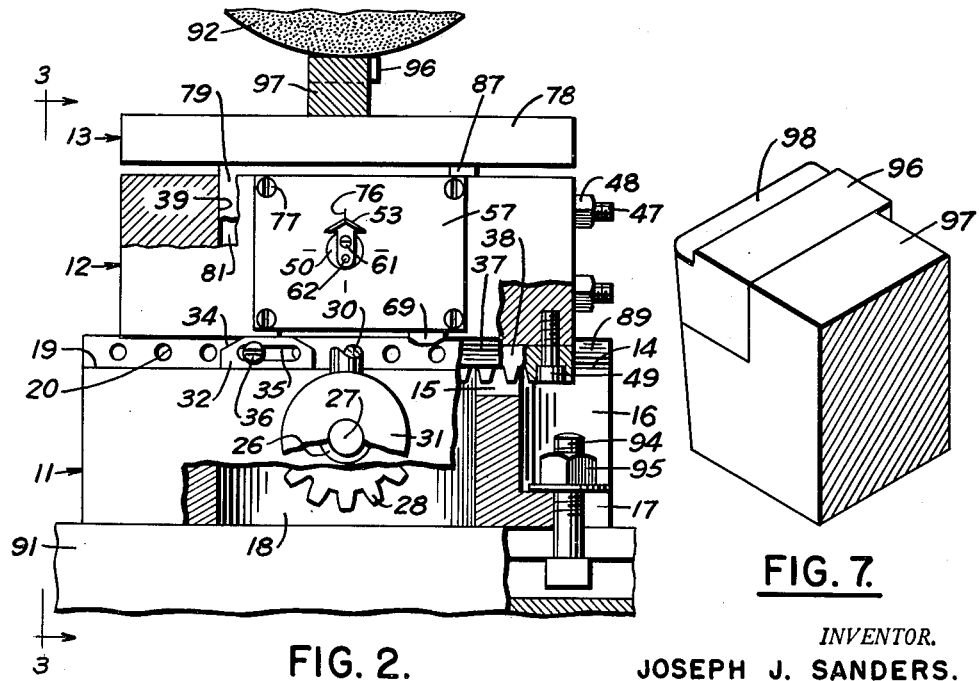
FIG. 2.
FIG. 7.
*INVENTOR.*
JOSEPH J. SANDERS.
BY
*G. J. Kessenich & J. H. Church*
ATTORNEYS.

Feb. 19, 1952        J. J. SANDERS        2,585,966

CHIP BREAKER RELIEF GRINDING FIXTURE

Filed May 4, 1950        2 SHEETS—SHEET 2

INVENTOR.
JOSEPH J. SANDERS.
BY
*G. J. Kessenich & J. H. Church*
ATTORNEYS.

Patented Feb. 19, 1952

2,585,966

UNITED STATES PATENT OFFICE 2,585,966

CHIP BREAKER RELIEF GRINDING FIXTURE

Joseph J. Sanders, Philadelphia, Pa.

Application May 4, 1950, Serial No. 159,915

5 Claims. (Cl. 51—231)

(Granted under the act of March 3, 1883, as amended April 30, 1928; 370 O. G. 757)

The invention described in the specification and claims may be manufactured and used by or for the Government for governmental purposes without the payment to me of any royalty thereon.

Broadly stated my invention relates to fixtures or attachments for grinding machines and the like, and although not limited solely thereto, has particular reference to fixtures for use in grinding chip breaker relief on cutting tools of the type used on such machines as lathes, planers, shapers and the like.

Previous to my invention, and before modern metallurgical progress had produced such hard alloys as the carbides and the like, it was common practice to grind chip breaker relief either by hand or by machine. Those with sufficient skill and time manually guided the tool to be ground against a rotating grinding wheel. However, in mass production manufacturing establishments, tools were usually ground by machine in order to accomplish the advantages of economy and uniformity. In the machine grinding of chip breaker relief, the tool was mounted on a horizontally reciprocable work table which carried the tool past a rotating grinding wheel. After each pass, the grinding head was manually lowered, thus increasing the depth of the grind, and the work table was made to move back to the starting position again, thus carrying the tool past the grinding wheel a second time. This process was repeated until the grinding operation was completed.

The manual, vertical feeding of the machine's grinding head prior to each time the tool was made to pass under the grinding wheel resulted in grinds of non-uniform depth and, whenever the depth was too great the grinding wheel became overloaded. Such procedure, besides being hazardous, detracted from the useful life of both the tool being ground and the grinding wheel, and therefore was extremely inefficient.

With the advent of the much superior carbide cutting tools, however, the inadequacies of existing procedures for tool grinding were even further pronounced. Because of the great hardness of the carbides used in cutting tools, new grinding wheels and new grinding procedures were demanded. The former aspect of the problem has been admirably overcome by the development of diamond grinding wheels, but until the making of my present invention the latter aspect appears to have lacked a satisfactory solution.

Those skilled in the art of grinding know that carbide cutting tools invariably should be ground by a diamond, or similar type grinding wheel. They know, too, that in order to prevent overloading and damage to the carbide and/or the grinding wheel, the depth of tool-to-wheel feed, per pass, should not exceed certain recognized amounts depending on the type of carbide and the type of grinding wheel. The depths of feed are very small and preferably should be of uniform amounts each time, but this cannot be easily and repeatedly obtained by the manual feeding methods used heretofore.

I eliminate the hazards and disadvantages of the old grinding procedures and, at the same time obtain hitherto unknown advantages and superior accomplishments, by providing a grinding fixture which consists essentially of a base, a carriage, and a stage. The base is secured to the work table of a conventional grinding machine. Rotary oscillation of an operating lever located in the base causes horizontal reciprocating motion of the carriage which is slidably engaged to the base. Reciprocation of the carriage over the fixed base automatically causes intermittent rotation of a ratchet wheel and a feed cam. Rotation of the ratchet and the feed cam cause the stage, upon which is mounted the article being ground, to rise in uniform steps a limited distance vertically out of the carriage toward the machine's grinding wheel.

For illustrative purposes only, the description of my inventive fixture here presented will pertain to its use in grinding one simple form of chip breaker relief in the cutting end of a carbide insert which is securely seated, in well known fashion, in the shank of a lathe or similar cutting tool.

One object of my invention is to provide a grinding fixture whose use will increase the useful life of both grinding wheels and carbide tools by preventing damage thereto during the grinding process.

Another object is to provide a grinding fixture which gives automatic, uniform depth of feed adjustment to the article being ground in relation to the grinding wheel.

A further object is to provide a grinding fixture which can be used on the most elementary type of conventional grinding equipment.

A still further object is to provide a grinding fixture which is simple in design, inexpensive and easy to construct, operate, and maintain, and at the same time being fully adequate in performance.

The foregoing and other objects and advantages of my invention will become apparent after an inspection of the following description and the accompanying drawings, wherein:

Fig. 1 is a plan view of my novel fixture, partly broken away and partly in section, showing its relationship to various well known grinding machine components used in connection therewith;

Fig. 2 is a side view, partly broken away and partly in section, taken along line 2—2 of Fig. 1;

Fig. 6 is a partial, vertical cross section taken along line 6—6 of Fig. 4, the cover plate having been restored to position for completeness; and Fig. 7 is a perspective view of the cutting end of a carbide-tipped lathe or similar tool illustrating one simple form of chip breaker relief ground into the carbide insert of the tool.

Figure 3:
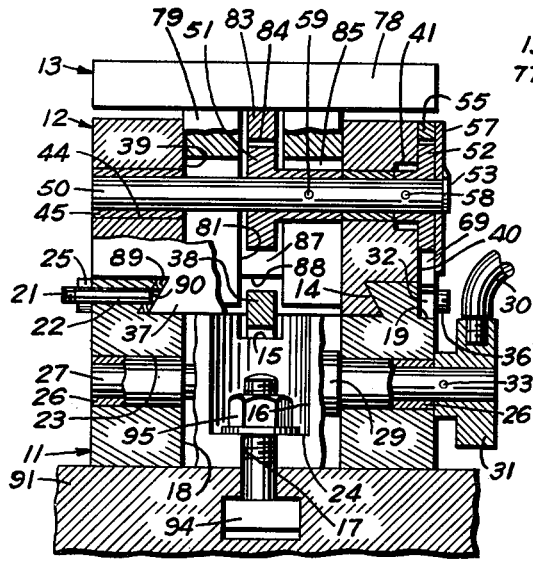
Fig. 3 is an end view, partly broken away and partly in section, taken along line 3—3 of Fig. 2.

As seen in Figs. 1 to 6, the prominent parts of my invention now to be described are a base 11, a carriage 12 and a stage 13, each unit having certain auxiliary components assembled to it.

*The base and components assembled thereto*

Referring to Figs. 1, 2, 3 and 5, base 11 is a rectangularly shaped block which has the female member 14 of a dovetail joint, a gear rack groove 15, nut recesses 16, T-bolt slots 17, a central recess 18, a ledge 19, threaded holes 20, gib screws 21, gib dowels 22, and a bushed shaft hole 23.

Figure 5:
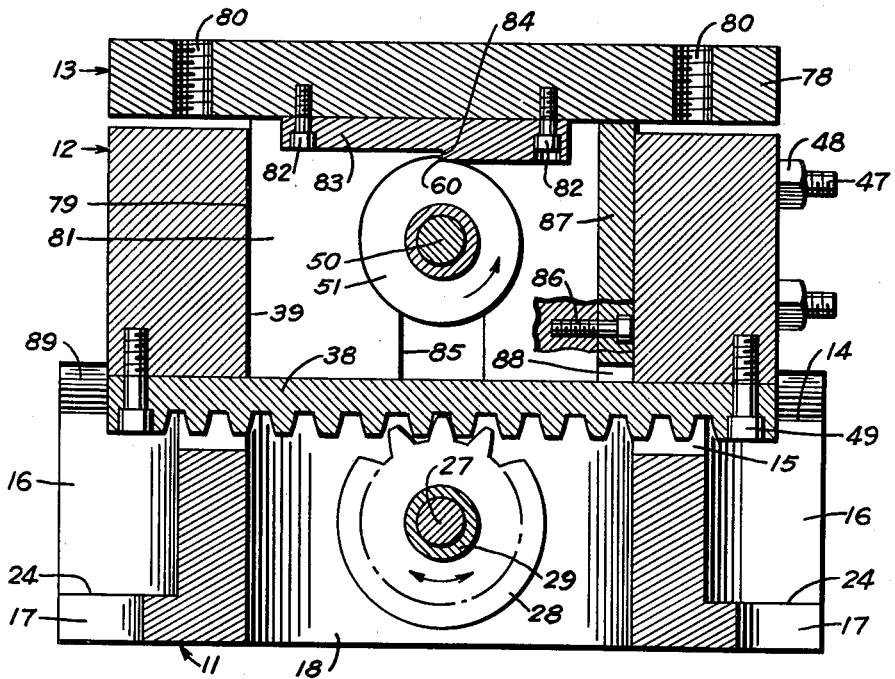
Fig. 5 is a vertical, longitudinal section, somewhat enlarged, taken along line 5—5 of Fig. 1.

Dovetail member 14 is formed in the upper surface of the base (see Figs. 1, 2, 3, 5 and 6) and extends lengthwise therein (see Figs. 1, 2 and 5).

Gear rack groove 15 is centrally formed in the floor of the dovetail member and extends in the same direction as that member, as shown in Figs. 2, 3 and 5.

Nut recesses 16 and T-bolt slots 17 are centrally formed in opposite ends of the base, the two forming at their juncture the shoulder 24 (see Figs. 1, 2, 3 and 5).

Central recess 18 is located equidistant between nut recesses 16 and the front and rear sides of the base and extends vertically therethrough as shown in Figs. 2, 3 and 5.

Figure 4:
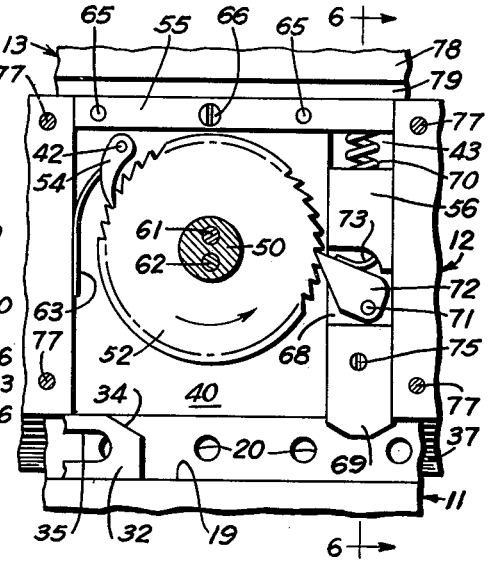
Fig. 4 is a portion, enlarged, of a side view taken along line 4—4 of Fig. 1, a cover plate having been removed for additional clarity.

Ledge 19 is formed on the front side of the base at its upper limit and extends lengthwise parallel to dovetail member 14 (see Figs. 1, 2, 3, 4 and 6). Located at convenient intervals midway in the depth of the ledge and extending inwardly are threaded, blind holes 20 as represented in Figs. 2 and 4.

Gib screws 21 and gib dowels 22 are located at convenient intervals in the rear side of the base, approximately midway in the depth of the dovetail, and extend perpendicularly into dovetail member 14 (see Figs. 1 and 3). Following adjustment of the gib screws at assembly, their position is secured by means of lock nuts 25. The gib dowels, for a reason which will become apparent later, protrude slightly into the one side of dovetail 14 as shown in Fig. 3.

Shaft hole 23 is located somewhat above the base's lower surface, midway its length, and extends from front to back across the base in a direction perpendicular to the dovetail. Pressed into shaft hole 23 are bushings 26 (see Fig. 3).

Other components assembled into base 11 are a rotatable shaft 27, a gear 28 having a hub 29, an operating lever 30 having a hub 31, and feed lugs 32. The operating lever is secured to the projecting front end of the shaft by means of a tapered pin 33, while the gear is secured to the shaft in a similar fashion (not shown) within the base's central recess 18. (See Figs. 2, 3 and 5.)

Feed lugs 32, having specially shaped ends 34 and oblong openings 35, rest upon ledge 19 and can be adjustably secured into position thereon by means of screws 36 and threaded openings 20, as shown in Figs. 1 to 4. Ordinarily two feed lugs are used in the operation of my fixture, as will be explained later, but only one need be used if desired.

*The carriage and components assembled thereto*

Referring to Figs. 1 to 6, carriage 12 is also a rectangularly shaped block substantially the same width as base 11 but somewhat shorter in length. The carriage is provided with the male member 37 of a dovetail joint, a gear rack 38, a central recess 39, a ratchet wheel groove 40, a hub recess 41, a locking pawl post 42, a pawl bar groove 43, a shaft hole 44, bushings 45, cylindrical adjusting slugs 46, threaded adjusting studs 47, and lock nuts 48.

Dovetail member 37 is formed in the central portion of the carriage's lower surface (see Fig. 3), and extends lengthwise therein (see Figs. 2 and 4). Gear rack 38 is secured, as by screws 49, in the lower surface of the dovetail member so as to be in alignment with gear 28 located in the fixture's base 11 (see Figs. 1, 2, 3 and 5).

Central recess 39 extends vertically through the carriage and is, when assembled to base 11, in alignment with recess 18 in the base.

Ratchet wheel groove 40, containing hub recess 41 (see Fig. 3) and locking pawl post 42 (see Fig. 4), is located in the mid portion of the front side of the carriage and extends vertically from top to bottom (see Figs. 1, 3 and 4). In the right side of the ratchet wheel groove, and extending in the same direction, is pawl bar groove 43, shown in Figs. 1, 4 and 6.

Shaft hole 44, located parallel to and directly above the base's shaft 27, extends from front to rear and contains shaft bushings 45 which are pressed into the position depicted by Fig. 3.

Cylindrical adjusting slugs 46 and threaded adjusting studs 47 are located through the right-hand end of the carriage in holes which communicate with the recess 39 (see Fig. 1). They are positioned near the upper and lower surfaces of the carriage, and are just astride the fixture's longitudinal central plane (see Figs. 1, 2 and 5). After proper adjustment of the adjusting studs at assembly, their position is secured by means of lock nuts 48.

Other components having relation to the carriage are a rotatable shaft 50, a feed cam 51, a ratchet wheel 52, a pointer 53, a locking pawl 54, a closure bar 55, a pawl bar 56, and a cover plate 57.

Shaft 50, accompanied in shaft bushings 45 (see Fig. 3), has ratchet wheel 52 secured near its forward end as by tapered pin 58 (see Fig. 3). Also on the shaft, but located within the recess 39 by means of tapered pin 59, is feed cam 51 having a step 60 (see Figs. 3 and 5).

The diameter of ratchet wheel 52 and the circular pitch of its teeth, of course, may be made to any convenient dimensions depending upon the desired total rise of feed cam 51 and the desired rise of stage 13 per each pass of carriage 12 over feed lugs 32. For example, if the total rise of the feed cam were twelve-thousandths of an inch (.012") and the ratchet wheel had sixty (60) teeth, the feed cam would raise the stage two ten-thousandths of an inch (.0002") per each pass, provided the ratchet wheel were revolved one tooth at a time. However, as will become evident later, the ratchet wheel may be revolved more than one tooth at a time if it is desired to raise the stage a distance equivalent to a limited multiple of the single step rise.

Pointer 53 is secured to the projecting front end of shaft 50 (see Figs. 1 to 3) by means of screw 61 and dowel 62 (see Figs. 2 and 4) so that the pointer is in alignment with step 60 of feed cam 51.

Locking pawl 54, having attached spring 63, is positioned on pawl post 42 so that the spring constantly urges the pawl against the ratchet wheel, thus preventing clockwise rotation of the wheel as shown in Fig. 4.

Closure bar 55, containing blind recess 64 (see Fig. 6), is shaped to fill the upper end of ratchet wheel groove 40 and pawl bar groove 43 (see Figs. 1, 3, 4 and 6). The bar is positioned on dowel pins 65, and is secured in place by means of screw 66.

Pawl bar 56 contains a blind recess 67 at its upper end, a pawl recess 68 in its front surface, and a stepped, specially shaped lower end 69. Blind recess 67 accommodates a coil spring 70 (see Fig. 6). The pawl recess contains a post 71 upon which pivots the pawl 72 having the spring 73 (see Fig. 4). The stepped, shaped lower end of the pawl bar accommodates an adjusting screw 74 which is held in position by a set screw 75 (see Fig. 6). As is evident from Figs. 4 and 6, coil spring 70 constantly urges pawl bar 56 downward away from closure bar 55, and pawl spring 73 constantly urges pawl 72 into engagement with ratchet wheel 52. In Fig. 6 it can be seen that the downward limit of travel of pawl bar 56 is governed by adjusting screw 74. Thus the sliding motion of the pawl bar can be increased or decreased by proper adjustment of the adjusting screw.

Cover plate 57, containing an opening for shaft 50 surrounded by conveniently spaced reference markings 76, is secured to the front side of carriage 12, as shown in Figs. 1, 2, 3 and 6, by means of screws 77.

*The stage and components assembled thereto*

From Figs. 1 to 6, stage 13 is seen to comprise a flat, horizontal table portion 78 from whose lower surface a centrally located pedestal portion 79 projects vertically downward.

The flat, horizontal table portion 78 is substantially of the same width and length as slide 12 (see Figs. 1, 2, 3 and 5), and contains a plurality of conveniently spaced, threaded holes 80 only two of which are indicated (see Figs. 1 and 5).

The pedestal portion 79 is of such dimension from front to rear as to be slidably engageable with recess 39 in carriage 12 (see Figs. 1, 3 and 6), but the pedestal's length from side to side is somewhat less than recess 39 for reasons which will be explained later (see Figs. 1, 2 and 5).

Extending lengthwise along the center of pedestal portion 79 is a groove 81 whose bottom is continuous with the lower surface of flat, horizontal table portion 78 of the stage (see Figs. 1, 2, 3 and 5). Secured within this groove by means of screws 82 is a thrust pad 83 having a step 84 as shown in Figs. 3 and 5. As Fig. 5 shows, the thrust pad is positioned within groove 81 so that step 84 is over the axis of the carriage's shaft 50 and is facing to the left. The step, too, is slightly greater in depth than the rise of feed cam 51.

Also positioned in pedestal portion 79 of stage 13, but extending from front to rear, is a shaft groove 85 (see Figs. 3 and 5) so positioned and of sufficient depth as to straddle the carriage's shaft 50 and the hub of feed cam 51 when the stage is engaged in the carriage.

Attached to the right end of the pedestal portion by means of screws 86 (one of which is shown in Fig. 5) is a wear plate 87 having the rack groove 88. The wear plate is substantially the same length and width, respectively, as the end of the pedestal portion to which it is attached, but its thickness is specially chosen to fill the gap between the right-hand end of the pedestal and the right-hand end of the carriage's recess 39. Therefore, when assembled together, the pedestal will be slidably engageable in recess 39 (see Figs. 3 and 5).

*The assembled fixture*

As shown in Figs. 2, 3, 5 and 6, base 11 and carriage 12 are slidably engaged by means of dove-tail members 14 and 37. In order to provide proper freedom between the two parts there is interposed between them a gib 89 (see Figs. 1 2, 3 and 5) which can be adjusted to and from the dove-tail member 37 by means of gib screws 21 (see Figs. 1 and 3). Gib 89 is prevented from sliding out of place by means of the dowels 22 whose inner ends project into corresponding holes 90 in the gib as indicated in Fig. 3.

Pedestal portion 79 of stage 13 is then slidably engaged with the carriage's recess 39 as shown in Figs. 1, 2, 3, 5 and 6. When so positioned the pedestal's groove 81 straddles the carriage's feed cam 51 and gear rack 38, the wear plate's groove 88 also straddles the carriage's gear rack, and the pedestal's shaft groove 85 rests astride the carriage's shaft 50 and the feed cam's hub. The desired amount of freedom between the pedestal and the carriage is obtained by means of the adjusting slugs 46 and adjusting studs 47. When properly positioned the adjusting studs are secured by means of lock nuts 48.

*Fixture's operation*

As a starting point in describing the fixture's operation, we will assume that stage 13 is at its lowest point within carriage 12, and that carriage 12 is approximately equidistant between the ends of base 11. In other words, the condition shown in Figs. 2 and 5 exists.

In putting my invention to use it is positioned on the table 91 of any simple grinding machine so that the axis of the base's shaft 27 is substantially in the same vertical plane as the axis of the machine's grinding wheel 92 mounted on spindle 93 (see Figs. 1 and 2). The base of the fixture is then secured to the machine's table by means of T-bolts 94 and nuts 95 as shown in Figs. 1 to 3.

The illustrative work piece in which chip breaker relief is to be ground, represented by carbide insert 96 of tool shank 97, is positioned atop the fixture's stage 13 in proper relationship to grinding wheel 92 and the shank is secured to the stage by any convenient means (not shown).

Operating lever 30 is oscillated back and forth in order to determine where to position feed lugs 32 (see Figs. 2 to 4). After deciding upon the required amount of reciprocation of carriage 12, the feed lugs are secured in position by means of screws 36. Prior to the actual grinding operation, the machine's grinding head is set so that grinding wheel 92 is just tangent to the upper surface of the carbide insert 96.

Having completed the "set-up," grinding wheel 92 is caused to rotate (by means not shown). The machine operator turns lever 30 so as to oscillate it from side to side. This motion causes carriage 12 and its contained stage 13 to reciprocate, thus carrying the work piece back and forth past grinding wheel 92. Reciprocation of the carriage, in addition, intermittently carries the vertically slidable pawl bar 56 into contact with one of the feed lugs 32 positioned at each end of the carriage's sliding motion. As the lower, specially shaped end of the pawl bar rides upon the feed lug, the pawl bar is caused to slide upwardly in its groove 43 against the force of spring 70.

Periodic upward movement of the pawl bar imparts counterclockwise rotation to ratchet wheel 52 by means of pawl 72 which is constantly urged against the ratchet wheel by means of spring 73. As evident from Fig. 4, locking pawl 54, constantly urged against the ratchet wheel by means of its spring 63, prevents clockwise slippage of the wheel.

Counterclockwise rotation of ratchet wheel 52 results in rotation of shaft 50 and its attached pointer 53 and feed cam 51 in the same direction. The amount of this rotation in relation to the starting point is indicated on cover plate 57 by noting the position of the pointer in relation to the reference markings 76 on the cover plate.

As the feed cam is intermittently rotated in a counterclockwise direction, the radius from its center to its periphery gradually increases in equal increments up to a certain limit, the total difference being indicated by the size of step 60 (see Fig. 5). By virtue of these increments, as the feed cam rotates, it causes stage 13 to rise intermittently in uniform steps out of carriage 12 toward grinding wheel 92.

It can thus be seen that feed cam 51 imparts depth of feed adjustment to stage 13 after each time the tool being ground is carried past the grinding wheel. Repeated oscillation of the operating lever will cause the stage to rise only to a certain maximum, as determined by the rise of the feed cam, thus completing the grinding of the chip breaker relief 98. After that maximum is reached, the stage's weight causes it to slide back within the carriage so that the thrust pad rests upon the feed cam's low point.

In those cases where chip breaker relief must be ground at compound angles, any convenient type of universal vise may be mounted atop stage 13 for holding the tool to be ground.

*Conclusion*

Although my invention has here been described as being used in the grinding of chip breaker relief upon a carbide tipped cutting tool, it has been for the purpose of illustration only. Those skilled in the art will be quick to realize that many modifications and variations thereof are possible without departing from its original spirit and scope.

For that reason I wish not to be limited by the narrow confines of this illustrative application, but only by the scope of the appended claims.

From the foregoing it will be apparent that I have provided a grinding fixture whose use will increase the useful life of both grinding wheels and carbide tools by preventing damage thereto during the grinding process; that I have provided a grinding fixture which gives automatic, uniform depth of feed adjustment to the article being ground in relation to the grinding wheel; that I have provided a grinding fixture which can be used on the most elementary type of grinding equipment; and that I have provided a grinding fixture which is simple in design, inexpensive and easy to construct, operate and maintain, and at the same time being fully adequate in performance.

I claim:

1. In a tool grinding fixture, the combination of a base, a carriage slidably mounted for reciprocatable movement across the face of said base, a tool supporting stage borne by said carriage for movement therewith but extensible therefrom on a line substantially perpendicular to the face of said base, cam-actuated means for extending said stage from said carriage, and means coacting with said cam-actuated means so that each time the carriage is reciprocated the stage is extended a predetermined small increment until a maximum is reached equivalent to the maximum thrust supplied by the cam.

2. In a tool grinding fixture, the combination of a base, a gear rotatably mounted in said base, a carriage mounted for reciprocatable movement across the face of said base, a gear rack secured to said carriage and meshed with said gear, an operating lever for rotating said gear so as to reciprocate said carriage, a tool supporting stage borne by said carriage for movement therewith but extensible therefrom on a line substantially perpendicular to the face of said base, cam-actuated means for extending said stage from said carriage, and means coacting with said cam-actuated means so that each time the carriage is reciprocated the stage is extended a predetermined small increment until a maximum is reached equivalent to the maximum thrust supplied by the cam.

3. In a tool grinding fixture, the combination of a base, a carriage slidably mounted for reciprocatable movement across the face of said base, a tool-supporting stage borne by said carriage for movement therewith but extensible therefrom on a line substantially perpendicular to the face of said base, a feed cam adapted so that as it is rotated it cyclically extends said stage from said carriage a distance which gradually increases to a predetermined maximum, a ratchet wheel secured to said feed cam for rotation therewith, a feed lug attached to said base, a pawl bar resiliently mounted on said carriage and protruding therefrom so as to contact said feed lug and be pushed thereby away from said base each time said carriage is reciprocated, a feed pawl resiliently mounted in said pawl bar for engagement with the teeth of said ratchet wheel whereby rotative force is transmitted to said wheel and in turn to said feed cam each time said feed lug pushes said pawl bar away from the base, and a locking pawl resiliently mounted on said carriage for engagement with the teeth of said ratchet wheel to prevent rotation of that wheel in a direction opposite to that in which it is urged by said feed pawl.

4. In a tool grinding fixture, the combination of a base, a gear rotatably mounted in said base, a carriage mounted for reciprocatable movement across the face of said base, a gear rack secured to said carriage and meshed with said gear, an operating lever for rotating said gear so as to reciprocate said carriage, a tool supporting stage borne by said carriage for movement therewith but extensible therefrom on a line substantially perpendicular to the face of said base, a feed cam adapted so that as it is rotated it cyclically extends said stage from said carriage a distance which gradually increases to a predetermined maximum, a ratchet wheel secured to said feed cam for rotation therewith, a feed lug attached to said base, a pawl bar resiliently mounted on said carriage and protruding therefrom so as to contact said feed lug and be pushed thereby away from said base each time said carriage is reciprocated, a feed pawl resiliently mounted in said pawl bar for engagement with the teeth of said ratchet wheel whereby rotative force is transmitted to said wheel and in turn to said feed cam each time said feed lug pushes said pawl bar away from the base, and a locking pawl resiliently mounted on said carriage for engagement with the teeth of said ratchet wheel to prevent rotation of that wheel in a direction opposite to that in which it is urged by said feed pawl.

5. In a tool grinding fixture, the combination of a base, a carriage slidably mounted for reciprocatable movement across the face of said base, a tool-supporting stage borne by said carriage for movement therewith but extensible therefrom on a line substantially perpendicular to the face of said base, a thrust pad secured to said stage so as to face said base, a spiral cam adapted so that as it is rotated it cyclically contacts said thrust pad to extend said stage from said carriage a distance which gradually increases to a predetermined maximum and immediately thereafter returns to a predetermined minimum, means coacting with said cam and said base so that each time the carriage is reciprocated the cam is rotated in predetermined increments, reference markings borne by a member on said carriage, and a pointer attached to said cam so as to turn therewith and located so that it is in constant alignment with that point on the cam which separates the adjoining cam portions that respectively cause maximum and minimum extension of said stage from said carriage.

JOSEPH J. SANDERS.

REFERENCES CITED

The following references are of record in the file of this patent:

UNITED STATES PATENTS

| Number | Name | Date |
|---|---|---|
| 837,660 | Blanpain et al. | Dec. 4, 1906 |
| 2,490,614 | Bedford | Dec. 6, 1949 |
| 2,490,848 | Vossler | Dec. 13, 1949 |

FOREIGN PATENTS

| Number | Country | Date |
|---|---|---|
| 240,498 | Germany | Dec. 8, 1910 |